(12) United States Patent
Joshi et al.

(10) Patent No.: US 11,736,601 B2
(45) Date of Patent: *Aug. 22, 2023

(54) SYSTEM FOR AUTHENTICATING A PHONE NUMBER USING A PHONE NUMBER CERTIFICATE

(71) Applicant: McAfee, LLC, San Jose, CA (US)

(72) Inventors: Harsha Ramamurthy Joshi, Bangalore (IN); Shashank Jain, Bangalore (IN); Piyush Pramod Joshi, Aurangabad (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,299

(22) Filed: Oct. 21, 2022

(65) Prior Publication Data

US 2023/0038446 A1 Feb. 9, 2023

Related U.S. Application Data

(63) Continuation of application No. 17/088,482, filed on Nov. 3, 2020, now Pat. No. 11,516,331.

(51) Int. Cl.
*H04M 1/66* (2006.01)
*H04L 9/40* (2022.01)
*H04M 3/436* (2006.01)

(52) U.S. Cl.
CPC .......... *H04M 1/66* (2013.01); *H04L 63/0823* (2013.01); *H04L 63/18* (2013.01); *H04M 3/4365* (2013.01)

(58) Field of Classification Search
CPC .......... H04M 1/66; H04M 3/4365; H04M 2203/6045; H04L 63/0823; H04L 63/18
See application file for complete search history.

(56) References Cited

U.S. PATENT DOCUMENTS

| 2007/0162742 | A1 | 7/2007 | Song et al. |
| 2008/0181380 | A1 | 7/2008 | Gustave et al. |
| 2011/0085650 | A1 | 4/2011 | Cheon et al. |
| 2012/0271768 | A1* | 10/2012 | Kang ............... G06Q 20/38215 705/44 |
| 2014/0337957 | A1* | 11/2014 | Feekes ............... H04L 63/0853 726/9 |

OTHER PUBLICATIONS

Peterson, J., et al., "ACME Identifiers and Challenges for Telephone Numbers," Network Working Group Internet-Draft draft-iet-acme-telephone-01.txt; Oct. 30, 2017, 8 pages.

* cited by examiner

*Primary Examiner* — Farid Seyedvosoghi
(74) *Attorney, Agent, or Firm* — Patent Capital Group

(57) ABSTRACT

An apparatus, related devices and methods, having a memory element operable to store instructions; and a processor operable to execute the instructions, such that the apparatus is configured to identify, on an electronic device, a phone number of an incoming caller device; request, via an out-of-band control channel, a digital certificate for the phone number from the incoming caller device; receive, via the out-of-band control channel, the digital certificate for the phone number from the incoming caller device; determine whether the digital certificate for the phone number is authentic; and indicate, on the electronic device, based on a determination that the digital certificate for the phone number is authentic or not authentic, whether the phone number is authentic or not authentic.

20 Claims, 7 Drawing Sheets

SYSTEM FOR AUTHENTICATING A PHONE NUMBER USING A PHONE NUMBER CERTIFICATE

CROSS-REFERENCE TO RELATED APPLICATIONS

This Application is a continuation (and claims the benefit of priority under 35 U.S.C. § 120) of U.S. application Ser. No. 17/088,482, filed Nov. 3, 2020 and entitled "SYSTEM FOR AUTHENTICATING A PHONE NUMBER USING A PHONE NUMBER CERTIFICATE." The disclosure of the prior Application is considered part of and is incorporated by reference in the disclosure of this Application.

TECHNICAL FIELD

This disclosure relates in general to the field of telecommunication systems and, more particularly, though not exclusively, to a system and method for verifying an identity associated with a phone number.

BACKGROUND

The field of telecommunication security has become increasingly important in today's society especially since mobile phones are an essential part of daily life. While the use of mobile phones, including smart phones, has transformed business and personal communications, it has also been used as a vehicle for malicious operators to gain access to sensitive information. Mobile phone numbers have become a primary mechanism to authenticate an individual's identity for completing online transactions using a mobile device or by making a phone call. Although a great convenience, these transactions have presented a huge opportunity for scamsters to lure people into a trap with fraudulent calls. Many innocent people have fallen prey to these fraudulent operators, who call claiming to be someone they are not or claiming to offer sensational discounts, and have been lured into sharing assess to personal and financial information. Techniques have been developed to verify a phone number using a crowd source mechanism. However, these techniques do not use a trusted source for verifying a phone number and create additional privacy concerns because these techniques typically collect information from a mobile device without user authorization.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
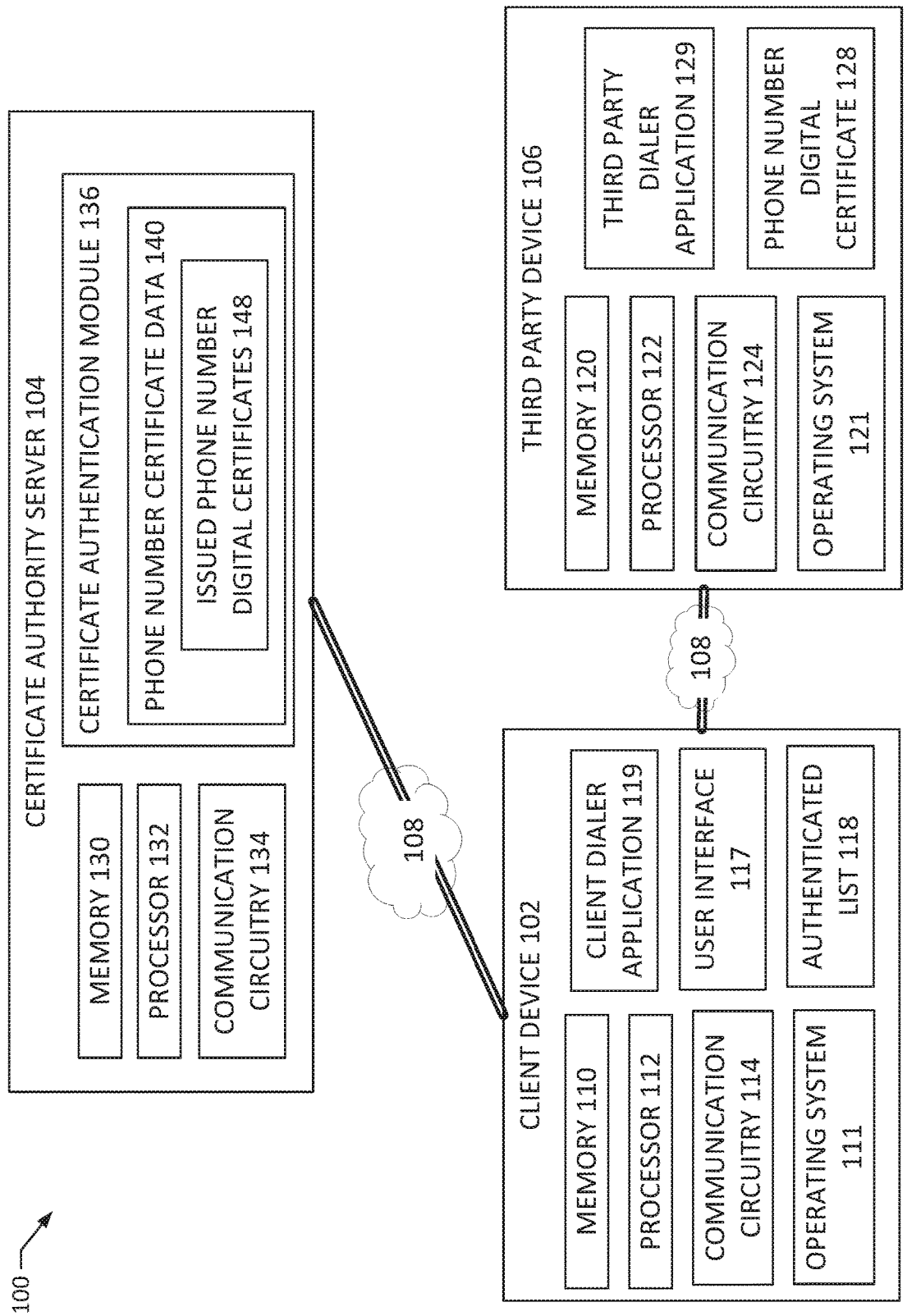
FIG. 1 is a simplified block diagram of an example system for authenticating a phone number, in accordance with an embodiment of the present disclosure.

An apparatus, including systems and methods, for verifying a phone number using a digital certificate is disclosed herein. For example, in some embodiments, an apparatus having one or more memory elements operable to store instructions; and one or more processors operable to execute the instructions, is configured to identify, on an electronic device, a phone number of an incoming caller device; request, via an out-of-band control channel, a digital certificate for the phone number from the incoming caller device; receive, via the out-of-band control channel, the digital certificate for the phone number from the incoming caller device; determine whether the digital certificate for the phone number is authentic; and indicate, on the electronic device, whether the digital certificate for the phone number is authentic or not authentic.

Mobile phone numbers have become a primary mechanism to authenticate an individual's identity for completing financial transactions or for providing online access. Many services like ordering food, scheduling a grocery delivery, booking a flight, paying a bill, or accessing government services may be done using a mobile device or by making a phone call. Although a great convenience, these transactions have presented a huge opportunity for scamsters to lure people into a trap with fraudulent calls. Many innocent people have fallen prey to these fraudulent operators, who claim to be someone they are not or claim to offer sensational discounts, and have been lured into sharing assess to financial information. For example, a common scenario involves a scam artist calling an individual and impersonating a bank employee in order gain access to the individual's banking information, such as login credentials, an account number, a debit card number, or a credit card number. Such fraudulent operations are possible because a mobile phone user does not have a trusted way to verify the identity of the caller and/or the caller's business, so many individuals rely on the verbal trust offered by caller during the phone call. In another example, an individual may search for a contact phone number of a business on the internet. Although most contact phone numbers listed in the search results are picked from the company's website and are legitimate, in some cases, the search results contain contact phone numbers posted on a blog or a third-party website. Such contact phone numbers are not verified and may be associated with a fraudulent operator. When calling the unverified phone number, an individual is likely to be unaware that the contact is fraudulent and is more likely to share sensitive information resulting in financial and personal loses. A system and method for verifying a contact associated with a phone number via a trusted certificate may be desired, including changes to an assigned phone number and registered ownership.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. Although certain elements may be referred to in the singular herein, such elements may include multiple sub-elements.

FIG. 1 is a simplified block diagram of a communication system 100 that enables verifying a phone number using a digital certificate, in accordance with an embodiment of the present disclosure. As illustrated in FIG. 1, an embodiment of communication system 100 may include a client device 102, a certificate authority server 104, a third party device 106, and network 108. The client device 102 may include memory 110, a processor 112, communication circuitry 114, an operating system 111, a client dialer application 119, a user interface 117, and an authenticated list 118. The client dialer application 119, or the client dialer application 119 in combination with the operating system 111, may be configured to implement verifying a phone number using digital certificates 128. The certificate authority server 104 may include memory 130, a processor 132, communication circuitry 134, and a certificate authentication module 136. The certificate authentication module 136 may further include phone number certificate data 140 and issued phone number digital certificates 148. The certificate authentication module 136 may be configured to analyze digital certificates 128 for phone numbers using the phone number certificate data 140 and/or the issued phone number digital certificates 148. In some embodiments, the certificate authority server 104 is part of a central authorized digital certificate issuing authority, or intermediate certificate issuing authority, that issues a digital certificate 148 for phone number as requested by a phone company that assigns the phone number to a client (e.g., an individual or business). In some embodiments, the certificate authority server 104 issues digital certificates 148 for phone numbers (e.g., such as phone number digital certificate 128) and the phone number certificate data 140 includes such digital certificates 148. The third party device 106 may include memory 120, a processor 122, communication circuitry 124, an operating system 121, a third party dialer application 129, and a phone number digital certificate 128. The client dialer application 119 may be configured to implement verifying a phone number using digital certificates. The client device 102, the certificate authority server 104, and the third party device 106 may be in communication using network 108.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the client device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The memory 110 may store computer executable instructions and data used by the operating system 111, and the client dialer application 119. The communication circuitry 114 may be used to send and receive commands, requests, and other data to and from the client device 102.

In some embodiments, the client dialer application 119 may be configured to identify a phone number of an incoming caller device (e.g., third party device 106) to the client device 102, establish an out-of-band control channel, and request and receive, via the out-of-band control channel, a digital certificate 128 for the phone number from the incoming caller device. In some embodiments, the digital certificate 128 for the phone number may be issued by the certificate authority at the request of a telephone company that is issuing and registering the phone number. The digital certificate 128 for the phone number may include a digital signature or other authentication identifier, an issuing certification authority, and identifier information associated with the phone number. For example, the identification information for the phone number may include a name of an individual or business that registered for the phone number, an address of the individual or business, a logo of the business for the phone number; other phone numbers registered to the individual or business, a date the digital certificate was issued, and a date the digital certificate expires, among others. The client dialer application 119 may be further configured to analyze the digital certificate 128 for the incoming phone number and to determine whether the digital certificate is authentic or not authentic. In some embodiments, the client dialer application 119 sends the digital certificate 128 for the phone number to the certificate authentication module 136 for analysis and determination of whether the digital certificate 128 is authentic or not authentic. After determining whether the digital certificate 128 is authentic or not authentic, the certificate authentication module 136 sends the results of the analysis to the client dialer application 119. The client dialer application 119 may be configured to receive the results of the analysis performed by the certificate authentication module 136 and determine whether the digital certificate 128 is authentic or not authentic. Based on a determination that the digital certificate 128 is authentic, the client dialer application 119 may be configured to indicate to the user via the user interface 117 that the phone number is authentic, verified, trusted, valid, or the like, and may extract the identification information from the digital certificate 128 and display the identification information (e.g., a business name and/or business logo) on the user interface 117. The client dialer application 119 may be further configured to store the phone number in the authenticated list 118. In some embodiments, the client dialer application 119 may be further configured to delete, based on a determination that the digital certificate 128 is expired, the phone number from the authenticated list 118. In some embodiments, the client dialer application 119 may search for the phone number in the authenticated list 118 and, based on the phone number being listed in the authenticated list 118, may indicate to the user via the user interface 117 that the phone number is authentic without requesting a digital certificate 128 for the phone number from the incoming caller device. In some embodiments, the authenticated list 118 may be the contacts list on the client device 102. Based on a determination that the digital certificate 128 is not authentic, the client dialer application 119 may be configured to indicate to the user via the user interface 117 that the phone number is not authentic, not trusted, unverified, invalid, a spam call, a telemarketing call, or the like. In some embodiments, the client dialer application 119 may block a connection to the phone number.

In some embodiments, the client dialer application 119 may be configured to identify a phone number of an outgoing call from the client device 102, establish an out-of-band control channel, and request and receive, via the out-of-band control channel, an issued digital certificate 148 for the phone number from the certificate authority server 104. The issued digital certificate 148 for the phone number may include a digital signature or other authentication identifier, an issuing certification authority, and identifier information associated with the phone number. For example, the identification information for the phone number may include a name of an individual or business that registered for the phone number, an address of the individual or business, a logo of the business for the phone number; other phone numbers registered to the individual or business, a date the digital certificate was issued, and a date the digital certificate expires, among others. After receiving the issued digital certificate 148 for the phone number, the client dialer application 119 may be configured to indicate to the user via the user interface 117 that the phone number is authentic, trusted, valid, or the like, may extract the identification information from the issued digital certificate 148 and display the identification information on the user interface 117 and may request to establish a connection to the phone number. The client dialer application 119 may be further configured to store the phone number in the authenticated list 118. In some embodiments, the client dialer application 119 may search for the phone number in the authenticated list 118 and, based on the phone number being listed in the authenticated list 118, may indicate to the user via the user interface 117 that the phone number is authentic. In some embodiments, the client dialer application 119 may be further configured to delete, based on a determination that the digital certificate is expired, the phone number from the authenticated list 118. Based on a determination that the digital certificate 128 is not authentic or if the requested digital certification 128 is not received, the client dialer application 119 may be configured to indicate to the user via the user interface 117 that the phone number is not authentic, not trusted, unverified, invalid, a spam call, a telemarketing call, or the like. In some embodiments, the client dialer application 119 may block a connection to the phone number.

In some embodiments, the client dialer application 119 may be configured to assign a fraud rating to a phone number. For example, a higher fraud rating may identify a phone number as having a greater risk of being fraudulent. The fraud rating may be any numerical value, or relative term, such as high/medium/low, that enables the ranking of a plurality of threat topics to indicate a phone number having a higher priority, a higher significance, or a greater threat risk as compared to another phone number having a lower significance, a lower priority, or a lesser threat risk. A fraud rating may be assigned using any suitable technique, for example, based on determining that the phone number digital certificate 128 is not authentic, or based on determining that other phone number digital certificates 128 of other phone numbers assigned to the individual or business are not authentic. In some embodiments, the client dialer application 119 may be configured to indicate to the user via the user interface 117 the fraud rating for the phone number. In some embodiments, the client dialer application 119 may block a connection to the phone number if the fraud rating is above a threshold.

The one or more processors 112, 122, 132 may include, without limitation, a central processing unit (CPU), a graphics processing unit (GPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102, the certificate authority server 104, and the third party device 106 may include a chipset (not shown) for controlling communications between one or more processors and one or more of the other components of the device. The processors 112, 122, 132 may also include one or more application specific integrated circuits (ASICs) or application specific standard products (ASSPs) for handling specific data processing functions or tasks.

The one or more memory elements 110, 120, 130, for storing information and data, may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110, 120, 130 may have stored thereon software modules and/or instructions associated with other components of the device. The memory 110, 120, 130 may include one or more operating systems application software.

The communication circuitry 114, 124, 134 may be embodied as any communication circuitry, device, or collection thereof, capable of enabling communications between the client device 102, the certificate authority server 104, and the third party device 106. The terms "communication circuitry" and "input/output (I/O) circuitry" may be used interchangeably herein. The communication circuitry 114, 124, 134 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 may further include peripheral devices (not shown), which may include any number of additional peripheral or interface devices and associated I/O circuitry, such as speakers, microphones, additional storage devices, among others.

Network 108 represents interconnected communication paths for receiving and transmitting packets of information that propagate through the communication system 100. Network 108 may provide a communicative interface and may be configured as any local area network (LAN), virtual local area network (VLAN), wide area network (WAN), wireless local area network (WLAN), metropolitan area network (MAN), Intranet, Extranet, virtual private network (VPN), a cellular network, and any other appropriate architecture or system that facilitates communications in a network environment, or any suitable combination thereof, including wired and/or wireless communication. Network 108 may include a network controller. Network 108 may further include one or more out-of-band control channels.

In communication system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud security server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware, and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

Figure 2A:
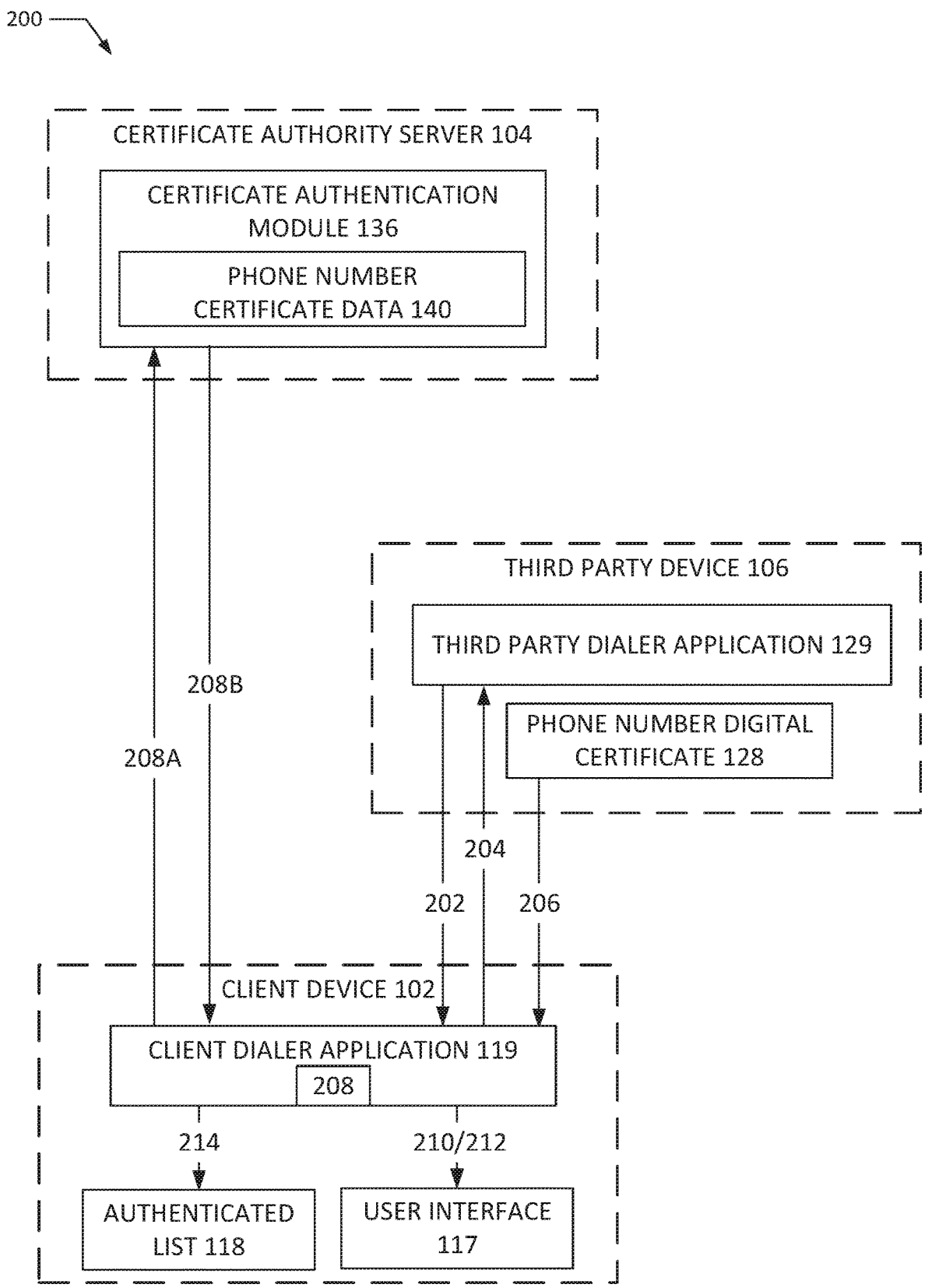
FIG. 2A is a simplified block diagram illustrating potential operations that may be associated with authenticating a phone number from an incoming caller device, in accordance with an embodiment of the present disclosure.
Figure 2B:
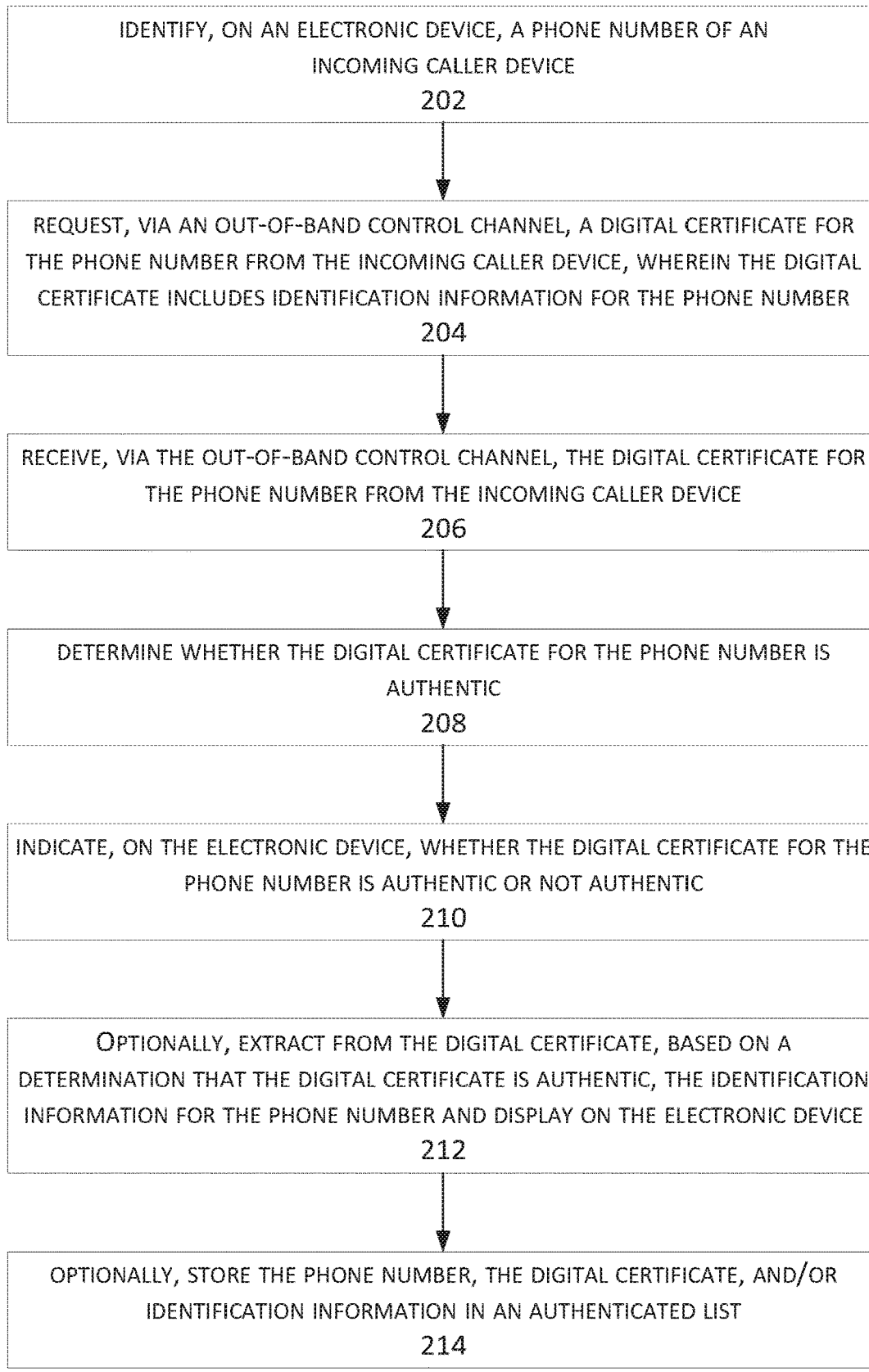
FIG. 2B is a simplified flowchart illustrating potential operations that may be associated with authenticating a phone number from an incoming caller device, in accordance with an embodiment of the present disclosure.

FIG. 2A is a simplified block diagram illustrating potential operations that may be associated with authenticating a phone number from an incoming caller device and FIG. 2B is a simplified flowchart illustrating potential operations of FIG. 2A, in accordance with an embodiment of the present disclosure. The one or more operations may be performed by the client dialer application 119. At 202, a phone number of an incoming caller device is identified on an electronic device. In some embodiments, the client dialer application monitors and detects the phone number of the incoming caller device. In some embodiments, a notification is provided on the electronic device to notify the user of the electronic device that the phone number is in the process of being verified. At 204, a digital certificate for the phone number is requested from the incoming caller device via an out-of-band control channel. The digital certificate may include identification information for the phone number, such as, a name of an individual or business that registered for the phone number, an address or city and state of the individual or business, a logo of the business that registered for the phone number, other phone numbers registered to the individual or business, a date the digital certificate was issued, and a date the digital certificate expires, among others. At 206, the digital certificate for the phone number is received from the incoming caller device via the out-of-band control channel. If a digital certificate is not received as requested, the phone number may be classified as not authentic and may be indicated as not authentic on the electronic device. In some embodiments, if the phone number is not authenticated, a user of the electronic device may be notified via a displayed message or via other feedback such as an audio message, or via an audio or a haptic indicator. At 208, the digital certificate for the phone number is analyzed to determine whether the digital certificate is authentic or not authentic. In some embodiments, the client dialer application determines whether the digital certificate is authentic or not authentic, for example, by analyzing a digital signature and verifying that the digital certificate is not expired. In some embodiments, the digital certificate is sent to a certificate authority server 208A for authentication. The certificate authority server analyzes the digital certificate, for example, by comparing the digital certificate to other issued digital certificates, and determines whether the digital certificate is authentic or not authentic. At 208B, a determination of whether the digital certificate for the phone number is authentic or not authentic is received from certificate authority. At 210, whether the digital certificate for the phone number is authentic or not authentic is indicated on the electronic device. In some embodiments, the indicator on the electronic device may be a displayed message. In some embodiments, the indicator on the electronic device may be an audio signal, an audio message, and/or haptic feedback. In some embodiments, based on a determination that the digital certificate is not authentic, the indicator may identify the phone number as not authentic, untrusted, unverified, or the like. In some embodiments, based on a determination that the digital certificate is authentic, the indicator may identify the phone number as authentic, trusted, verified, or the like. At 212, optionally, based on a determination that the digital certificate is authentic, the identification information for the phone number may be extracted from the digital certificate, and may be further included in the indicator on the electronic device. At 214, optionally, the phone number, the digital certificate, and/or the identification information is stored in an authenticated list. In some embodiments, after identifying the phone number of an incoming caller device (i.e., operation 202), a determination is made as to whether the phone number is listed in the authenticated list, and, based on a determination that the phone number is in the authenticated list, indicate on the electronic device that the phone number is authentic (i.e., operation 210).

Figure 3A:
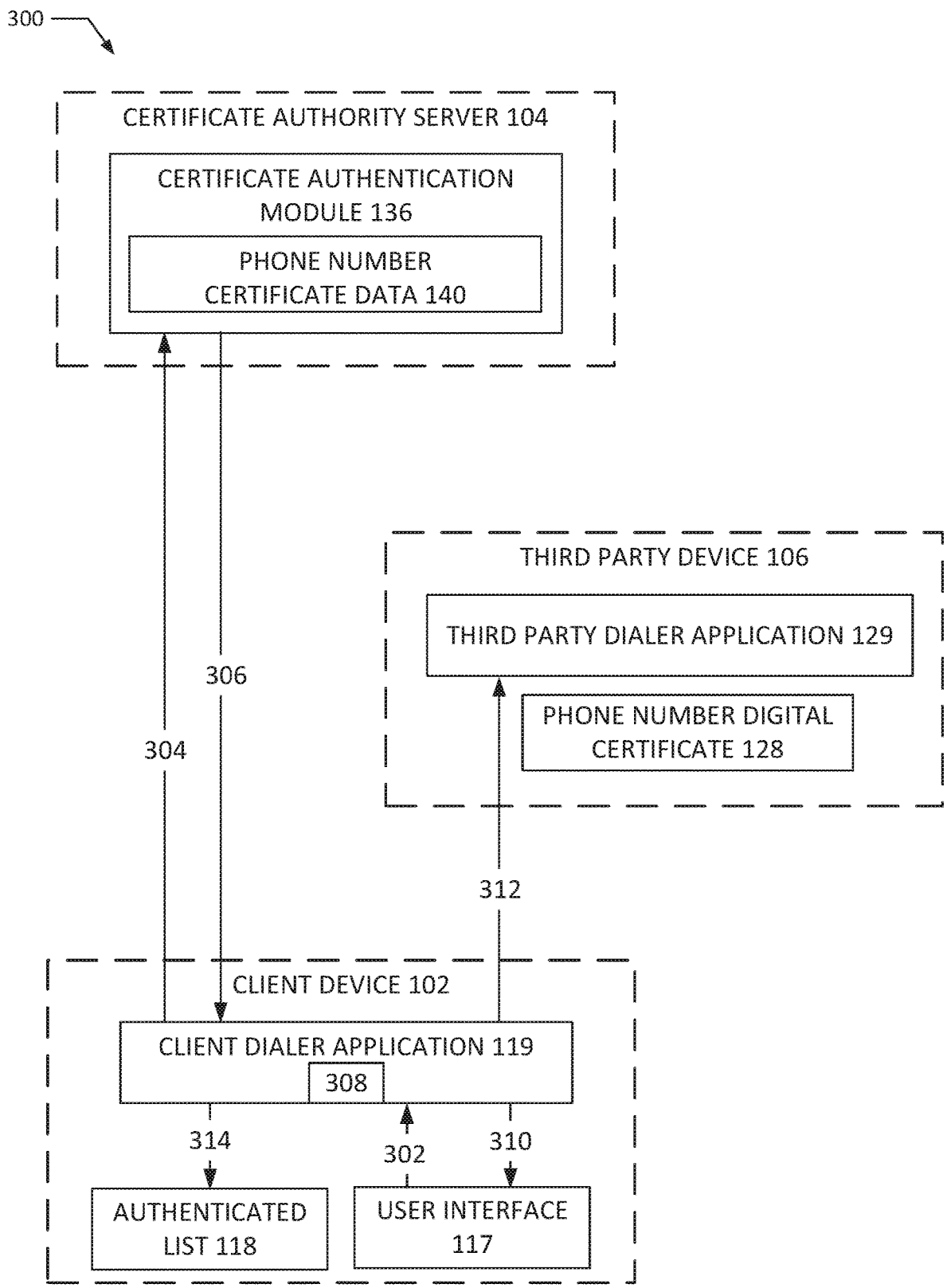
FIG. 3A is a simplified block diagram illustrating potential operations that may be associated with authenticating a phone number for an outgoing call, in accordance with an embodiment of the present disclosure.
Figure 3B:
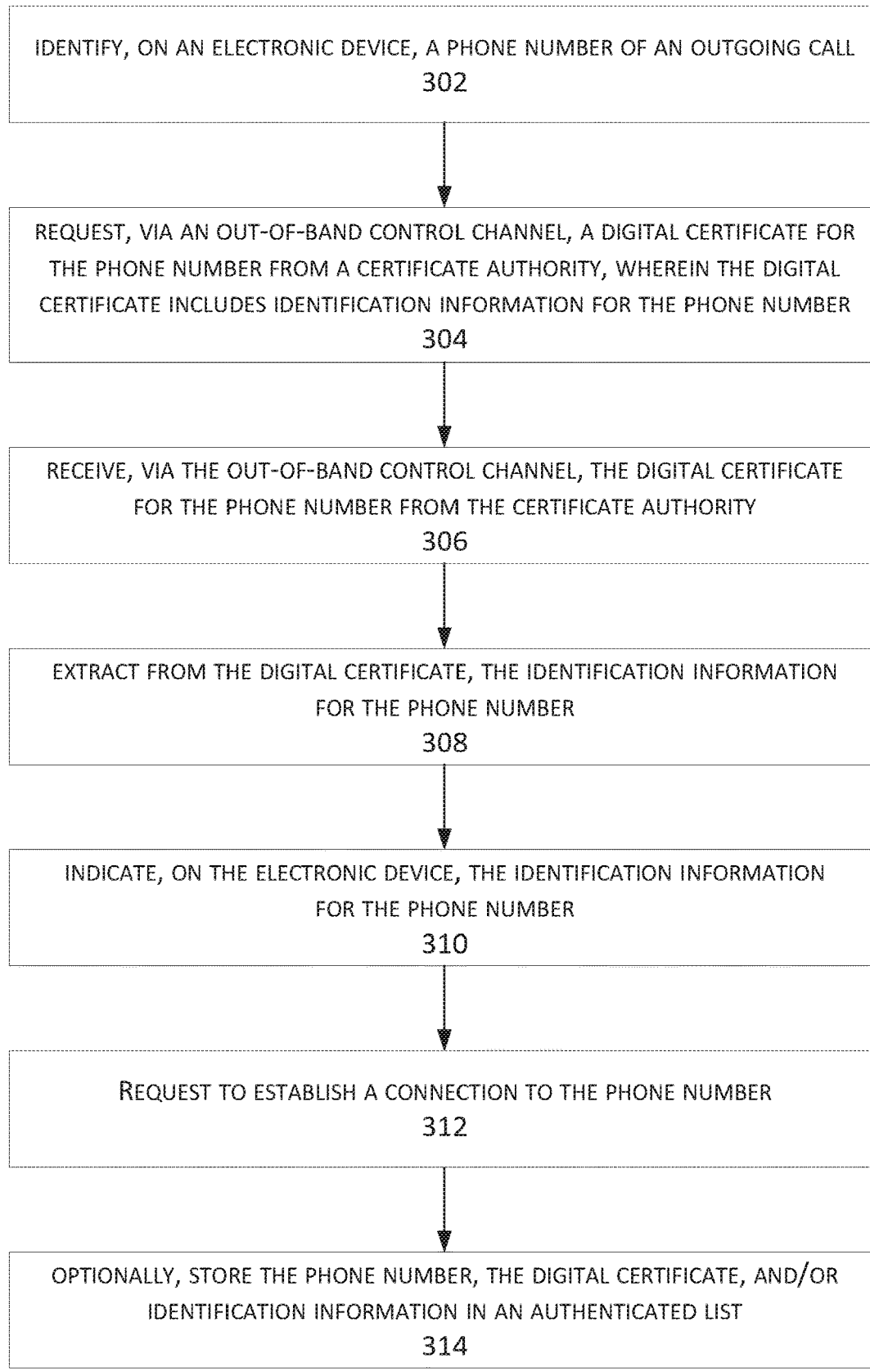
FIG. 3B is a simplified flowchart illustrating potential operations that may be associated with authenticating a phone number for an outgoing call, in accordance with an embodiment of the present disclosure.

FIG. 3A is a simplified block diagram illustrating potential operations that may be associated with authenticating a phone number for an outgoing call and FIG. 3B is a simplified flowchart illustrating potential operations of FIG. 3A, in accordance with an embodiment of the present disclosure. The one or more operations may be performed by the client dialer application 119. At 302, a phone number of an outgoing call is identified on an electronic device. In some embodiments, the client dialer application monitors and detects the phone number of the outgoing call. In some embodiments, a notification is provided on the electronic device to notify the user of the electronic device that the phone number is in the process of being verified. In some embodiments, the client dialer application delays making a request to establish a connection to the phone number. At 304, a digital certificate for the phone number is requested from a certificate authority via an out-of-band control channel. The digital certificate may include identification information for the phone number, such as, a name of an individual or business that registered for the phone number, an address of the individual or business, a logo of the business for the phone number; other phone numbers registered to the individual or business, a date the digital certificate was issued, and a date the digital certificate expires, among others. At 306, the digital certificate for the phone number is received from the certificate authority via the out-of-band control channel. If a digital certificate is not received as requested, the phone number may be classified as not authentic and may be indicated as not authentic on the electronic device. In some embodiments, if the phone number is not authenticated, a user of the electronic device may be notified via a displayed message or via other feedback such as an audio message, or via an audio or a haptic indicator. At 308, the identification information for the phone number is extracted from the digital certificate. At 310, the identification information for the phone number is indicated on the electronic device. In some embodiments, the indicator on the electronic device may be a displayed message or an audio message. At 312, a request to establish a connection to the phone number is made. At 314, optionally, the phone number, the digital certificate, and/or the identification information is stored in an authenticated list. In some embodiments, after identifying the phone number of an outgoing call (i.e., operation 302), a determination is made as to whether the phone number is listed in the authenticated list, and, based on a determination that the phone number is in the authenticated list, indicate on the electronic device the identification information for the phone number (i.e., operation 310).

Figure 4:
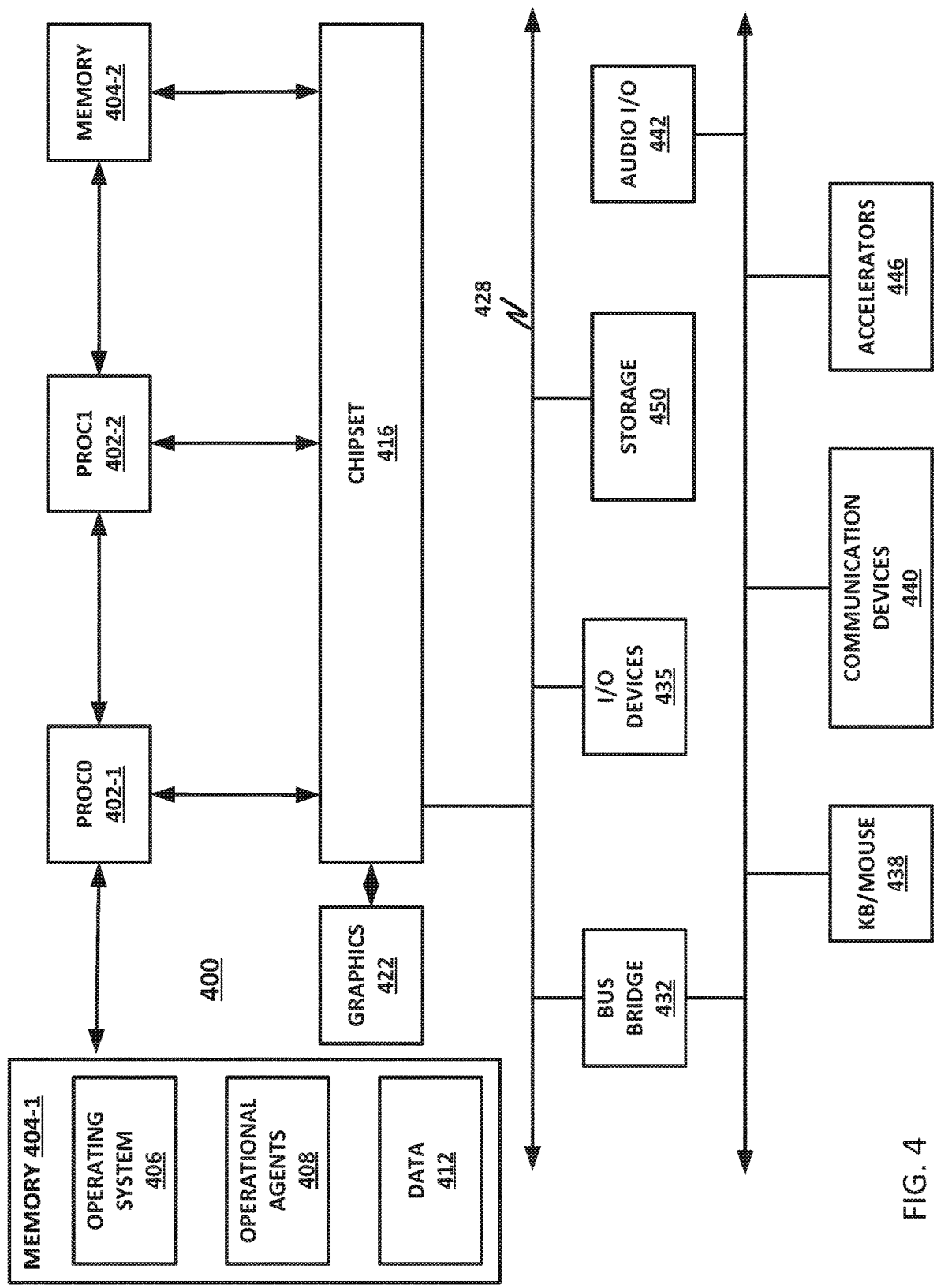
FIG. 4 is a block diagram of selected elements of a hardware platform.

FIG. 4 is a block diagram of a hardware platform 400. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 400, even though they may be scattered across a data center, or even located in different data centers.

Hardware platform 400 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device. In the illustrated example, hardware platform 400 is arranged in a point-to-point (PtP) configuration. This PtP configuration is popular for personal computer (PC) and server-type devices, although it is not so limited, and any other bus type may be used.

Figure 5:
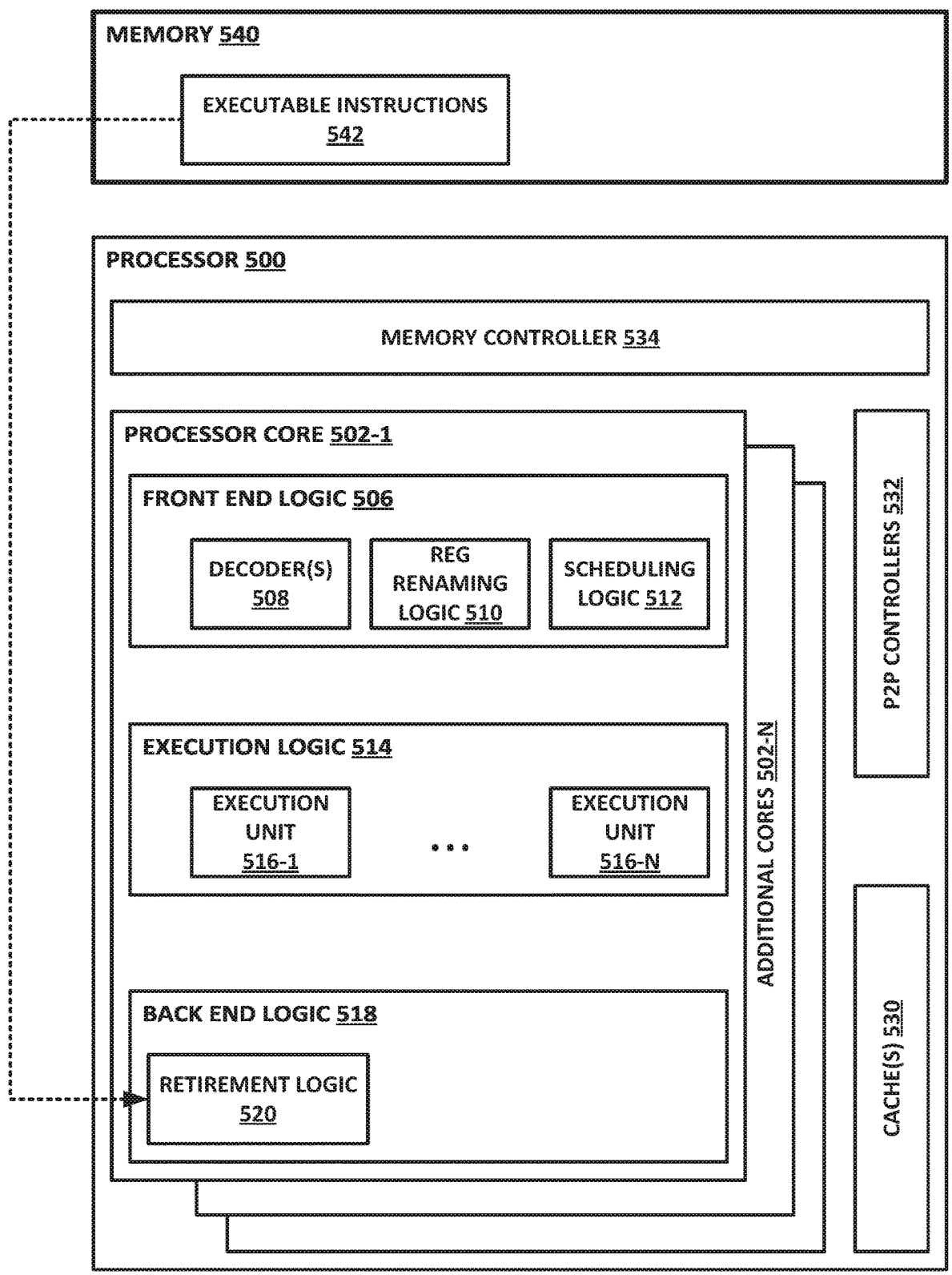
FIG. 5 is a block diagram of selected elements of a processor.

Hardware platform 400 is an example of a platform that may be used to implement embodiments of the teachings of this specification. For example, instructions could be stored in storage 450. Instructions could also be transmitted to the hardware platform in an ethereal form, such as via a network interface, or retrieved from another source via any suitable interconnect. Once received (from any source), the instructions may be loaded into memory 404, and may then be executed by one or more processor 402 to provide elements such as an operating system 406, operational agents 408, or data 412. Hardware platform 400 may include several processors 402. For simplicity and clarity, only processors PROC0 402-1 and PROC1 402-2 are shown. Additional processors (such as 2, 4, 8, 16, 24, 32, 64, or 128 processors) may be provided as necessary, while in other embodiments, only one processor may be provided. Details of processors 402 are not illustrated in this FIGURE, but one embodiment is illustrated in FIG. 5. Processors may have any number of cores, such as 1, 2, 4, 8, 16, 24, 32, 64, or 128 cores.

Processors 402 may be any type of processor and may communicatively couple to chipset 416 via, for example, PtP interfaces. Chipset 416 may also exchange data with other elements, such as a high-performance graphics adapter 422. In alternative embodiments, any or all of the PtP links illustrated in FIG. 4 could be implemented as any type of bus, or other configuration rather than a PtP link. In various embodiments, chipset 416 may reside on the same die or package as a processor 402 or on one or more different dies or packages. Each chipset may support any suitable number of processors 402. A chipset 416 (which may be a chipset, uncore, Northbridge, Southbridge, or other suitable logic and circuitry) may also include one or more controllers to couple other components to one or more CPUs.

Two memories, 404-1 and 404-2 are shown, connected to PROC0 402-1 and PROC1 402-2, respectively. As an example, each processor is shown connected to its memory in a direct memory access (DMA) configuration, though other memory architectures are possible, including ones in which memory 404 communicates with processor 402 via a bus. For example, some memories may be connected via a system bus, or in a data center, memory may be accessible in a remote DMA (RDMA) configuration. Memory 404 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 404 may be used for short, medium, and/or long-term storage. Memory 404 may store any suitable data or information utilized by platform logic. In some embodiments, memory 404 may also comprise storage for instructions that may be executed by the cores of processors 402 or other processing elements (e.g., logic resident on chipsets 416) to provide functionality. In certain embodiments, memory 404 may comprise a relatively low-latency volatile main memory, while storage 450 may comprise a relatively higher-latency nonvolatile memory. However, memory 404 and storage 450 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 404 and storage 450, for example, in a single physical memory device, and in other cases, memory 404 and/or storage 450 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 422 may be configured to provide a human-readable visual output, such as a command-line interface (CLI) or graphical desktop such as Microsoft Windows, Apple OSX desktop, or a Unix/Linux X Window System-based desktop. Graphics adapter 422 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 422 may include a hardware graphics card, which may have its own memory and its own graphics processing unit (GPU).

Chipset 416 may be in communication with a bus 428 via an interface circuit. Bus 428 may have one or more devices that communicate over it, such as a bus bridge 432, I/O devices 435, accelerators 446, communication devices 440, and a keyboard and/or mouse 438, by way of nonlimiting example. In general terms, the elements of hardware platform 400 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example. Communication devices 440 can broadly include any communication not covered by a network interface and the various I/O devices described herein. This may include, for example, various USB, FireWire, Lightning, or other serial or parallel devices that provide communications.

I/O Devices 435 may be configured to interface with any auxiliary device that connects to hardware platform 400 but that is not necessarily a part of the core architecture of hardware platform 400. A peripheral may be operable to provide extended functionality to hardware platform 400, and may or may not be wholly dependent on hardware platform 400. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example. In one example, audio I/O 442 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form. Bus bridge 432 may be in communication with other devices such as a keyboard/mouse 438 (or other input devices such as a touch screen, trackball, etc.), communication devices 440 (such as modems, network interface devices, peripheral interfaces such as PCI or PCIe, or other types of communication devices that may communicate through a network), audio I/O 442, a data storage device 450, and/or accelerators 446. In alternative embodiments, any portions of the bus architectures could be implemented with one or more PtP links.

Operating system 406 may be, for example, Microsoft Windows, Linux, UNIX, Mac OS X, iOS, MS-DOS, or an embedded or real-time operating system (including embedded or real-time flavors of the foregoing). In some embodiments, a hardware platform 400 may function as a host platform for one or more guest systems that invoke application (e.g., operational agents 408). Operational agents 408 may include one or more computing engines that may include one or more nontransitory computer-readable mediums having stored thereon executable instructions operable to instruct a processor to provide operational functions. At an appropriate time, such as upon booting hardware platform 400 or upon a command from operating system 406 or a user or security administrator, processor 402 may retrieve a copy of the operational agent (or software portions thereof) from storage 450 and load it into memory 404. Processor 402 may then iteratively execute the instructions of operational agents 408 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 400 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 400 may be virtualized, in particular the processor(s) and memory. For example, a virtualized environment may run on OS 406, or OS 406 could be replaced with a hypervisor or virtual machine manager. In this configuration, a virtual machine running on hardware platform 400 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

FIG. 5 is a block diagram illustrating selected elements of a processor 500. In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing) machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 500 may include any number of processing elements, which may be symmetrical or asymmetrical. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 500 includes one or more processor cores 502, including core 502-1-502-N. Cores 502 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 500 may include at least one shared cache 530, which may be treated logically as part of memory 540. Memory 540 may include executable instructions 542, as illustrated. Caches 530 may be filled according to known caching techniques, and may store instructions and/or data that may be used by one or more components of processor 500. Processor 500 may include an integrated memory controller (MC) 534, to communicate with memory 540. Memory controller 534 may include logic and circuitry to interface with memory 540, and may also include a cache controller to handle filling and evicting instructions and data to and from cache 530. By way of example, each core 502 may include front-end logic 506, execution logic 514, and back-end logic 518. In the illustrated embodiment, front-end logic 506 includes an instruction decoder or decoders 508, register renaming logic 510, and scheduling logic 512. Decoder 508 may decode instructions received. Register renaming logic 510 may provide register renaming, for example to facilitate pipelining. Scheduling logic 512 may schedule instruction execution, and may provide out-of-order (OOO) execution. Front-end logic 506 may fetch incoming instructions, perform various processing (e.g., caching, decoding, branch predicting, etc.), and pass instructions to execution logic 514. Execution logic 514 includes one or more execution units 516-1-516-N. Execution units 516 may include hardware instructions and microcode to carry out the provided instructions. Backend logic 518 includes retirement logic 520. Core 502 may provide for speculative execution of instructions, branch prediction, and similar. Retirement logic 520 may be configured to determine which predicted instructions were actually needed by the program flow. Processor 500 may also include a PtP controller 532, which enables connection to an uncore, chipset, Northbridge, Southbridge, or bus, by way of example.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

Example Implementations

The following paragraphs provide various examples of the embodiments disclosed herein.

Example 1 is an apparatus, including: one or more memory elements operable to store instructions; and one or more processors operable to execute the instructions, such that the apparatus is configured to: identify, on an electronic device, a phone number of an incoming caller device; request, via an out-of-band control channel, a digital certificate for the phone number from the incoming caller device, wherein the digital certificate includes identification information for the phone number; receive, via the out-of-band control channel, the digital certificate for the phone number from the incoming caller device; determine whether the digital certificate for the phone number is authentic; and indicate, on the electronic device, based on a determination that the digital certificate for the phone number is authentic or not authentic, whether the phone number is authentic or not authentic.

Example 2 may include the subject matter of Example 1, and may be further configured to extract from the digital certificate, based on a determination that the digital certificate for the phone number is authentic, the identification information for the phone number; and display, on the electronic device, the identification information for the phone number.

Example 3 may include the subject matter of Example 1 or 2, and may further specify that determining whether the digital certificate for the phone number is authentic is determined by a certificate authority, and the apparatus may be further configured to send the digital certificate for the phone number to the certificate authority; and receive, from certificate authority, a determination of whether the digital certificate for the phone number is authentic or not authentic.

Example 4 may include the subject matter of any of Examples 1-3, and may further specify that determining whether the digital certificate for the phone number is authentic is determined prior to the incoming caller device being connected.

Example 5 may include the subject matter of any of Examples 1-4, and may further specify that determining whether the digital certificate for the phone number is authentic is determined at least in part after the incoming caller device is connected.

Example 6 may include the subject matter of any of Examples 1-5, may be further configured to determine whether the phone number is in an authenticated list; and indicate, on the electronic device, based on a determination that the phone number is in the authenticated list, that the phone number is authentic.

Example 7 may include the subject matter of any of Examples 1-6, and may be further configured to store, based on a determination that the digital certificate is authentic, the phone number in an authenticated list.

Example 8 may include the subject matter of Example 7, and may be further configured to delete, based on a determination that the digital certificate is expired, the phone number from the authenticated list.

Example 9 is at least one non-transitory computer-readable medium comprising one or more instructions that when executed by a processor, cause the processor to identify, on an electronic device, a phone number of an outgoing call; request, via an out-of-band control channel, a digital certificate for the phone number from a certificate authority, wherein the digital certificate includes identification information for the phone number; receive, via the out-of-band control channel, the digital certificate for the phone number from the certificate authority; extract, from the digital certificate, the identification information for the phone number; indicate, on the electronic device, the identification information for the phone number; and request to establish a connection to the phone number.

Example 10 may include the subject matter of Example 9, and may further include one or more instructions that when executed by a processor, cause the processor to determine whether the phone number is in an authenticated list; and indicate, on the electronic device, based on a determination that the phone number is in the authenticated list, that the phone number is authentic.

Example 11 may include the subject matter of Examples 9 or 10, and may further include one or more instructions that when executed by a processor, cause the processor to store, based on receiving the digital certificate for the phone number from the certificate authority, the phone number in an authenticated list.

Example 12 may include the subject matter of Example 11, and may further include one or more instructions that when executed by a processor, cause the processor to delete, based on a determination that the digital certificate is expired, the phone number from the authenticated list.

Example 13 may include the subject matter of any of Examples 9-12, and may further include one or more instructions that when executed by a processor, cause the processor to indicate, on the electronic device, based on not receiving the digital certificate for the phone number from the certificate authority, that the phone number is not authentic.

Example 14 may include the subject matter of Example 13, and may further include one or more instructions that when executed by a processor, cause the processor to indicate using audio or haptic feedback that the phone number is not authentic.

Example 15 may include the subject matter of any of Examples 9-14, and may further specify that the identification information for the phone number is indicated on the electronic device prior to the request to establish a connection to the phone number.

Example 16 is a method, including: identifying, on an electronic device, a phone number of an incoming caller device; requesting, via an out-of-band control channel, a digital certificate for the phone number from the incoming caller device, wherein the digital certificate includes identification information for the phone number; receiving, via the out-of-band control channel, the digital certificate for the phone number from the incoming caller device; determining whether the digital certificate for the phone number is authentic; and indicating, on the electronic device, based on a determination that the digital certificate for the phone number is authentic or not authentic, whether the phone number is authentic or not authentic.

Example 17 may include the subject matter of Example 16, and may further include extracting from the digital certificate, based on a determination that the digital certificate for the phone number is authentic, the identification information for the phone number; and displaying, on the electronic device, the identification information for the phone number.

Example 18 may include the subject matter of Examples 16 or 17, and may further specify that determining whether the digital certificate for the phone number is authentic is determined by a certificate authority, and may further include sending the digital certificate for the phone number to the certificate authority; and receiving, from certificate authority, a determination of whether the digital certificate for the phone number is authentic or not authentic.

Example 19 may include the subject matter of any of Examples 16-18, and may further specify that determining whether the digital certificate for the phone number is authentic is determined prior to the incoming caller device being connected.

Example 20 may include the subject matter of any of Examples 16-19, and may further include storing, based on a determination that the digital certificate is authentic, the phone number in an authenticated list.

The invention claimed is:

1. An apparatus, comprising:
   one or more memory elements operable to store instruction; and
   one or more processors operable to execute the instruction, such that the apparatus is configured to:
   identify a phone number for an outgoing call from an electronic device;

request, via an out-of-band control channel, a digital certificate for the phone number;

receive, via the out-of-band control channel, the digital certificate for the phone number; and based on a determination that the digital certificate for the phone number is authentic or not authentic, indicate on the electronic device whether the phone number is authentic or not authentic.

2. The apparatus of claim 1, wherein the digital certificate includes identification information for the phone number.

3. The apparatus of claim 1, wherein a certificate authority determines if the digital certificate for the phone number is authentic or not authentic.

4. The apparatus of claim 1, further configured to:
send the digital certificate for the phone number to a certificate authority; and
receive, from certificate authority, a determination of whether the digital certificate for the phone number is authentic or not authentic.

5. The apparatus of claim 1, wherein the digital certificate for the phone number is determined to be authentic or not authentic prior to the outgoing call being connected.

6. The apparatus of claim 1, wherein before a determination is made about whether the digital certificate for the phone number is authentic or not authentic, a notification is provided on the electronic device that indicates the phone number is being authenticated.

7. The apparatus of claim 1, wherein if the phone number is not authentic, the apparatus is further configured to:
provide visual, audio, and/or haptic feedback that indicates the phone number was not authentic.

8. The apparatus of claim 1, wherein if the phone number is authentic, the apparatus is further configured to:
store the phone number in an authenticated list.

9. The apparatus of claim 8, wherein if the phone number is not authentic and is in the authenticated list, the apparatus is further configured to:
delete the phone number in the authenticated list.

10. The apparatus of claim 1, further configured to:
extract, from the digital certificate, identification information for the phone number.

11. The apparatus of claim 10, wherein the identification information for the phone number is indicated on the electronic device prior to the outgoing call being connected.

12. A method comprising:
identifying a phone number for an outgoing call from an electronic device;
requesting, via an out-of-band control channel, a digital certificate for the phone number;
receiving, via the out-of-band control channel, the digital certificate for the phone number; and
based on a determination that the digital certificate for the phone number is authentic or not authentic, indicating on the electronic device whether the phone number is authentic or not authentic.

13. The method of claim 12, wherein the digital certificate for the phone number is determined to be authentic or not authentic prior to the outgoing call being connected.

14. The method of claim 12, wherein before the determination is made about whether the digital certificate for the phone number is authentic or not authentic, a notification is provided that indicates the phone number is being authenticated.

15. The method of claim 12, further comprising:
extracting identification information from the digital certificate for the phone number, wherein the identification information for the phone number is indicated on the electronic device prior to the outgoing call being connected.

16. The method of claim 12, wherein if the phone number is not authentic, the method further comprising:
providing visual, audio, and/or haptic feedback that indicates the phone number was not authentic.

17. A method, comprising:
requesting, via an out-of-band control channel, a digital certificate for a phone number;
receiving, via the out-of-band control channel, the digital certificate for the phone number; and
based on a determination that the digital certificate for the phone number is authentic or not authentic, indicating on an electronic device whether the phone number is authentic or not authentic and assigning a fraud rating to the phone number.

18. The method of claim 17, further comprising:
sending the digital certificate for the phone number to a certificate authority; and
receiving, from certificate authority, a determination of whether the digital certificate for the phone number is authentic or not authentic and the fraud rating.

19. The method of claim 17, wherein the phone number is from an incoming caller device.

20. The method of claim 17, wherein the phone number is from an outgoing call from the electronic device.

* * * * *